US012305589B2

(12) United States Patent
Suzuki et al.

(10) Patent No.: US 12,305,589 B2
(45) Date of Patent: May 20, 2025

(54) FUEL INJECTION CONTROL DEVICE FOR INTERNAL COMBUSTION ENGINE

(71) Applicant: TOYOTA JIDOSHA KABUSHIKI KAISHA, Toyota (JP)

(72) Inventors: Yuki Suzuki, Kariya (JP); Mina Tachibana, Toyota (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 18/391,653

(22) Filed: Dec. 21, 2023

(65) Prior Publication Data

US 2024/0263596 A1  Aug. 8, 2024

(30) Foreign Application Priority Data

Feb. 6, 2023   (JP) ................... 2023-015980

(51) Int. Cl.
*F02D 41/30* (2006.01)
*F02D 19/02* (2006.01)
*F02D 21/06* (2006.01)

(52) U.S. Cl.
CPC ............ *F02D 41/30* (2013.01); *F02D 19/02* (2013.01); *F02D 21/06* (2013.01)

(58) Field of Classification Search
CPC .... F02D 35/023; F02D 35/024; F02D 35/025; F02D 35/026; F02D 35/027
See application file for complete search history.

(56) References Cited

U.S. PATENT DOCUMENTS

| | | | |
|---|---|---|---|
| 6,230,672 B1 * | 5/2001 | Ishibashi ................. | F02B 25/20 123/65 P |
| 6,293,095 B1 * | 9/2001 | Yamamoto ............ | F02D 41/405 60/272 |
| 8,113,186 B2 * | 2/2012 | Tsunooka ............ | F02D 41/0025 123/698 |
| 2001/0039934 A1 * | 11/2001 | Ohrnberger ............ | F01M 11/02 123/197.1 |
| 2023/0133431 A1 * | 5/2023 | Noguchi ............... | F02D 41/401 123/65 PE |
| 2024/0263596 A1 * | 8/2024 | Suzuki .................. | F02D 41/402 |

FOREIGN PATENT DOCUMENTS

JP   2009281298 A   12/2009

* cited by examiner

*Primary Examiner* — John Kwon

(57) ABSTRACT

An internal combustion engine includes a direct injection valve that directly inject gaseous fuel from an injection hole into a cylinder by separating a needle from a seat, and a blow-by gas treating device that recirculates blow-by gas from a crankcase to an intake passage. The control device executes a suction process of suctioning gas in the cylinder into an injection hole of the direct injection valve when the blow-by gas is being recirculated by the blow-by gas processing device.

4 Claims, 3 Drawing Sheets

FUEL INJECTION CONTROL DEVICE FOR INTERNAL COMBUSTION ENGINE

BACKGROUND

1. Field

The present disclosure relates to a fuel injection control device for an internal combustion engine.

2. Description of Related Art

For example, Japanese Laid-Open Patent Publication No. 2009-281298 discloses an injection valve that injects gaseous fuel. Gaseous fuels have lower lubricity than liquid fuels. Therefore, the injection valve described in Japanese Laid-Open Patent Publication No. 2009-281298 includes a seal member having a low friction coefficient between a needle and a nozzle body, which are sliding portions.

In an injection valve that injects gaseous fuel, a needle and a seat on which the needle is seated come into contact with each other without being lubricated. This may wear the seat.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel injection control device for an internal combustion engine is provided. The internal combustion engine includes a direct injection valve that directly inject gaseous fuel from an injection hole into a cylinder by separating a needle from a seat, and a blow-by gas treating device that recirculates blow-by gas from a crankcase to an intake passage. The fuel injection control device comprises processing circuitry configured to execute a suction process of suctioning gas in the cylinder into the injection hole when the blow-by gas is being recirculated by the blow-by gas processing device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

Hereinafter, a fuel injection control device for an internal combustion engine according to a first embodiment will be described.

Configuration of Internal Combustion Engine

Figure 1:
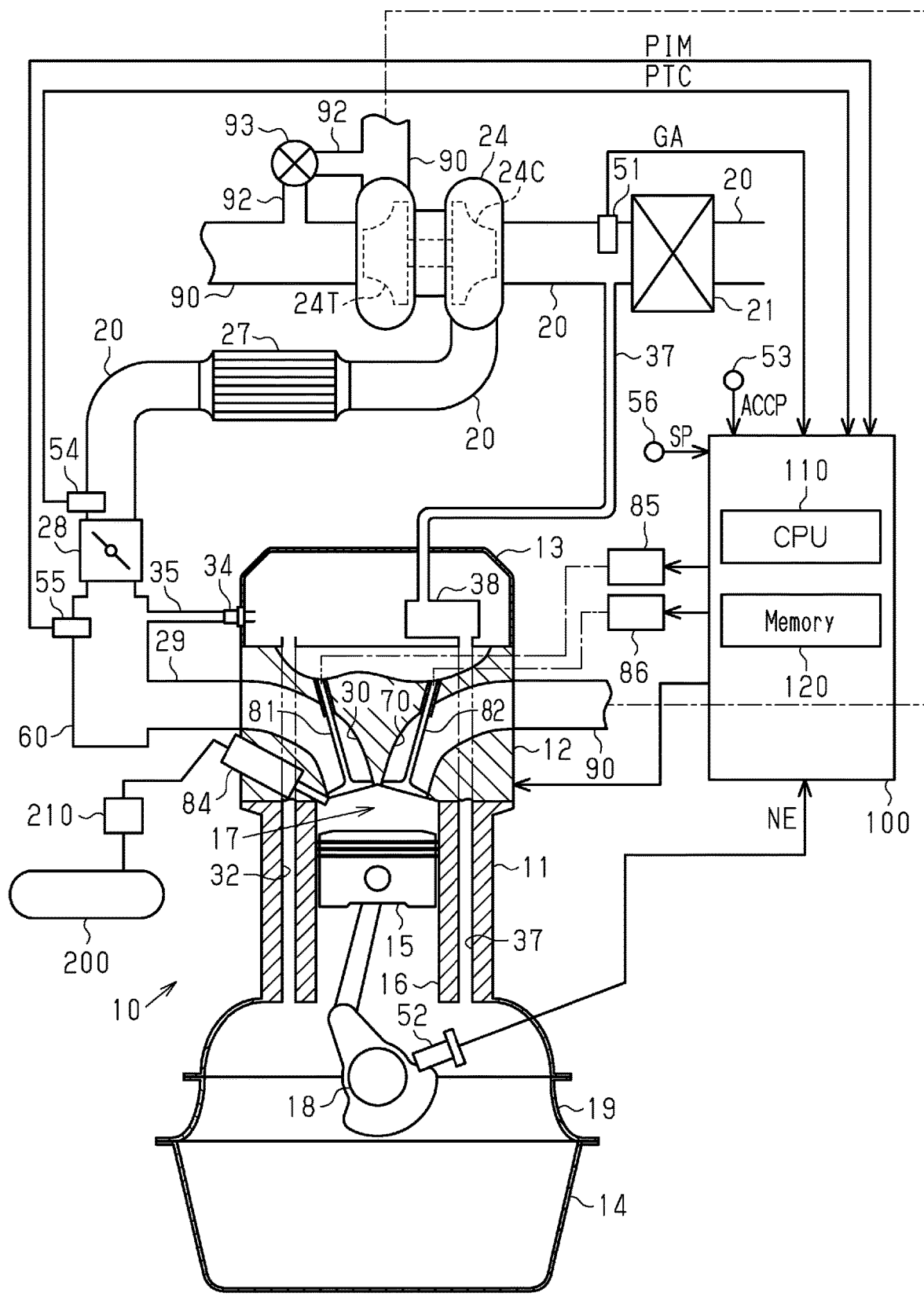
FIG. 1 is a schematic diagram showing the configuration of an internal combustion engine according to a first embodiment.

As shown in FIG. 1, the internal combustion engine 10 includes a cylinder block 11, a cylinder head 12, a head cover 13, and an oil pan 14. The cylinder block 11 includes a cylinder 16, in which a piston 15 is disposed to reciprocate.

The cylinder head 12 is provided with an intake port 30 for introducing intake air into a combustion chamber 17 of the internal combustion engine 10 and an exhaust port 70 for discharging exhaust gas from the combustion chamber 17. The intake port 30 is provided with an intake valve 81. The drive system of the intake valve 81 is provided with an intake-side variable valve timing mechanism 85, which is a variable valve actuation mechanism that changes valve timing (opening/closing timing) of the intake valve 81. The exhaust port 70 is provided with an exhaust valve 82. The drive system of the exhaust valve 82 is provided with an exhaust-side variable valve timing mechanism 86, which is a variable valve actuation mechanism that changes valve timing (opening/closing timing) of the exhaust valve 82.

The cylinder head 12 is provided with a direct injection valve 84 that directly injects hydrogen gas as gaseous fuel into the cylinder, and an ignition plug (not shown).

The direct injection valve 84 has a well-known structure and includes an injection hole for injecting gaseous fuel, a needle for opening and closing the injection hole, a seat on which the needle is seated, an electromagnetic coil for driving the needle, a spring for urging the needle in a valve closing direction, and the like. In the direct injection valve 84, when the needle is separated from the seat, the gaseous fuel is directly injected from the injection hole into the cylinder. Further, in the direct injection valve 84, the sum of the pressure of the fuel acting on the needle and the urging force of the spring becomes a valve closing force that urges the needle in the valve closing direction. In addition, the magnetic force of the electromagnetic coil and the in-cylinder pressure, which is the pressure in the cylinder, generated at the time of energization serve as a valve opening force that urges the needle in the valve opening direction. When the valve-closing force becomes smaller than the valve-opening force, the needle moves away from the seat to open the injection hole.

Hydrogen gas is stored in the tank 200. The hydrogen gas in the tank 200 is supplied to the direct injection valve 84 in a state where the pressure thereof is adjusted by the pressure reducing valve 210.

The pressure reducing valve 210 is a pressure adjusting mechanism that adjusts the fuel pressure, which is the pressure of the gaseous fuel supplied to the direct injection valve 84. The pressure reducing valve 210 is an electromagnetic valve and adjusts the fuel pressure, which is the pressure of the hydrogen gas supplied to the direct injection valve 84, to a target fuel pressure Pt corresponding to the engine operating state.

A crankcase 19 is provided below the cylinder block 11. The crankcase 19 accommodates a crankshaft 18, which is an output shaft of the internal combustion engine 10. The oil pan 14, which stores lubricant, is provided below the crankcase 19.

An intake manifold 29, which includes a surge tank 60, is connected to the upstream side of the intake port 30. An intake pipe 20 is connected to the upstream side of the surge tank 60. The intake pipe 20, the surge tank 60, and the intake manifold 29 form an intake passage of the internal combustion engine 10.

The intake pipe 20 includes, in order from the upstream end, an air cleaner 21, an air flow meter 51, a compressor wheel 24C of a forced-induction device 24, an intercooler 27, a boost pressure sensor 54, and a throttle valve 28. The forced-induction device 24 is driven by the exhaust gas discharged from the combustion chambers 17. The surge tank 60 is provided with an intake pressure sensor 55. The opening degree of the throttle valve 28 is changed by an electric motor.

The air cleaner 21 filters intake air taken into the intake pipe 20. The forced-induction device 24 compresses air in the intake pipe 20. The intercooler 27 cools the air that has passed through the compressor wheel 24C. The throttle valve 28 adjusts the intake air amount by adjusting the valve opening degree.

The air flow meter 51 detects an intake air amount GA. The supercharging pressure sensor 54 detects a supercharging pressure PTC at a downstream side of the compressor wheel 24C in the intake pipe 20. The intake pressure sensor 55 detects an intake pressure PIM that is a pressure in the surge tank 60.

An exhaust passage 90 is connected to the downstream side of the exhaust port 70. A housing that accommodates a turbine wheel 24T of the forced-induction device 24 is connected to an intermediate portion of the exhaust passage 90. A portion of the exhaust passage 90 on the upstream side of the turbine wheel 24T and a portion of the exhaust passage 90 on the downstream side of the turbine wheel 24T communicate with each other via a bypass passage 92. A wastegate valve (hereinafter, referred to as WGV) 93 is provided in the bypass passage 92. The opening degree of the WGV 93 is adjusted by an actuator. The WGV 93 is a valve that adjusts the amount of exhaust gas flowing through the bypass passage 92. As the opening degree of the WGV 93 increases, the amount of exhaust gas that bypasses the turbine wheel 24T and passes through the bypass passage 92 increases. Accordingly, the boost pressure of the intake air, which is increased by the forced-induction device 24, decreases.

The internal combustion engine 10 is provided with a blow-by gas treating device, which treats gas leaking from the combustion chamber 17 into the crankcase 19 during a compression stroke or a combustion stroke, that is, so-called blow-by gas. The blow-by gas processing device is a device that recirculates blow-by gas from the crankcase 19 to the intake passage. The blow-by gas treating device includes a suction passage 32 for guiding the blow-by gas in the crankcase 19 into the head cover 13. One end of the suction passage 32 opens into the head cover 13. The other end of the suction passage 32 opens into the crankcase 19. The suction passage 32 is provided with an oil separator (not shown).

The interior of the head cover 13 is connected to the surge tank 60 via the PCV valve 34 and the PCV passage 35. The PCV valve 34 surge tank 60 becomes lower than the pressure in the head cover 13, that is, the pressure in the crankcase 19, the PCV valve 34 opens to allow the blow-by gas to flow from the head cover 13 into the surge tank 60. The suction passage 32, the PCV valve 34, and the PCV passage 35 constitute a communication passage through which a surge tank 60 constituting a part of the intake passage communicates with the crankcase 19.

As described above, when the pressure in the surge tank 60 is lower than the pressure in the crankcase 19, the PCV valve 34 opens. Therefore, the blow-by gas in the crankcase 19 is suctioned into the surge tank 60 via the suction passage 32, the PCV valve 34, and the PCV passage 35. The suctioned blow-by gas is sent into the cylinder together with the intake air and burned.

The blow-by gas treating device is provided with an atmosphere introducing passage 37 for drawing in intake air into the crankcase 19 for scavenging. One of the opposite ends of the atmosphere introducing passage 37 is connected to a section of the intake pipe 20 between the air cleaner 21 and the compressor wheel 24C. The atmosphere introducing passage 37 extends through the head cover 13, passes through the inside of the cylinder head 12 and the cylinder block 11, and is connected to the crankcase 19. An atmosphere-side separator 38, which is an oil separator installed in the head cover 13, is provided in the atmosphere introducing passage 37.

A control device 100 controls the internal combustion engine 10. Specifically, the control device 100 operates various devices to be operated, such as the throttle valve 28, the direct injection valve 84, the ignition plug, the intake-side variable valve timing mechanism 85, the exhaust-side variable valve timing mechanism 86, the WGV 93, and the pressure reducing valve 210.

The control device 100 includes a CPU 110 that is a central processing unit, a memory 120 that stores programs and date for control, and the like. Then, the CPU 110 executes a program stored in the memory 120 to execute processing related to various controls.

Detection signals detected by sensors other than the above-described sensors are also input to the control device 100. For example, a detection signal of a crank angle sensor 52 that detects a rotation angle (crank angle) of the crankshaft 18 is input to the control device 100 in order to calculate the engine speed NE. The control device 100 also receives detection signals from, for example, an accelerator operation amount sensor 53 and a vehicle speed sensor 56. The accelerator operation amount sensor 53 detects an accelerator operation amount ACCP, which is an operation amount of an accelerator pedal. The vehicle speed sensor 56 detects a vehicle speed SP of a vehicle equipped with the internal combustion engine 10. A detection signal of a fuel pressure sensor 57 that detects the fuel pressure P of hydrogen gas supplied to the direct injection valve 84 is also input to the control device 100.

The control device 100 calculates an engine load factor KL based on the engine rotation speed NE and the intake air amount GA. The engine load factor KL represents the ratio of the current cylinder inflow air amount to the cylinder inflow air amount when the internal combustion engine 10 is steadily operated in the full load state. The cylinder inflow air amount is an amount of air flowing into each cylinder in the intake stroke.

Suction Process

A control device 100 executes a suction process for suctioning gas in a cylinder into an injection hole of a direct injection valve 84 when recirculation of blow-by gas by a blow-by gas processing device is performed.

Figure 2:
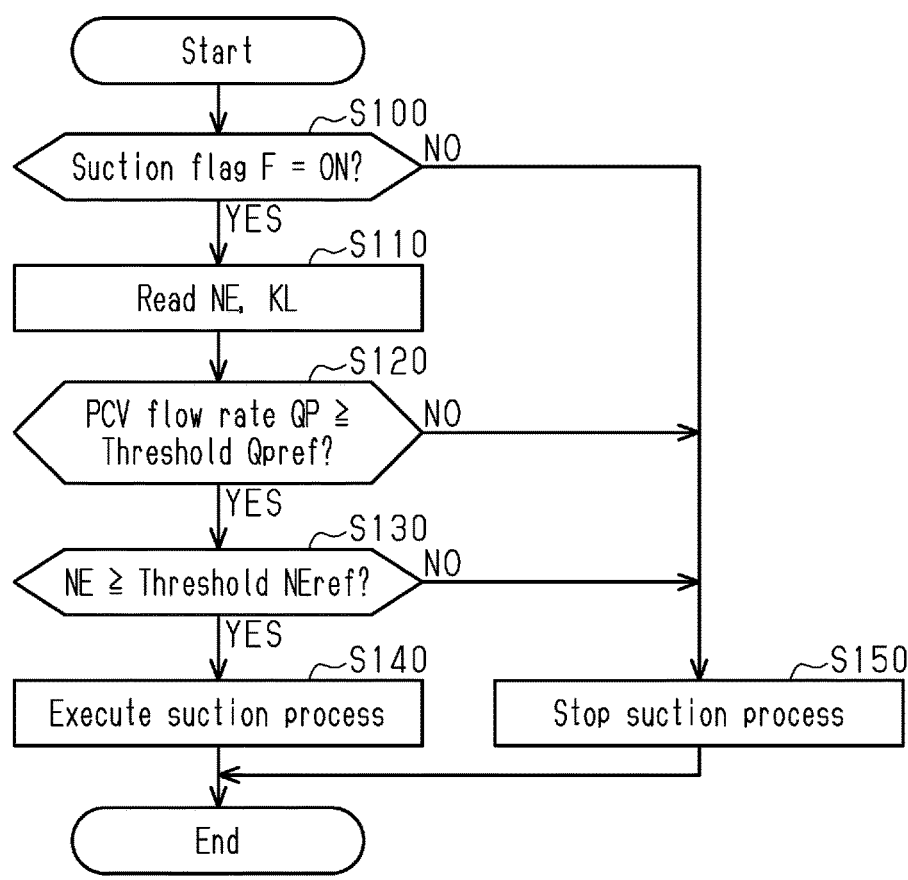
FIG. 2 is a flowchart showing a procedure of a process executed by the controller according to the first embodiment.

FIG. 2 shows a processing procedure for executing the suction process. The series of processes shown in FIG. 2 is performed by the CPU 110 executing a program stored in the memory 120 of the control device 100 at predetermined intervals. In the following description, the number of each step is represented by the letter S followed by a numeral.

When this process is started, the control device 100 determines whether or not a suction flag F is ON (S100). The intake flag F is, for example, a flag that is set to ON for each specified travel distance. The suction flag F is set to OFF when a suction process, which will be described later, is executed for a specified time or longer, or when a negative determination is made in any one of the processes of S120 and S130, which will be described later.

When the suction flag F is ON, the control device 100 reads the engine rotation speed NE and the engine load factor KL (S110).

Next, the control device 100 determines whether or not the PCV flow rate Qp is equal to or greater than the threshold value Qpref (S120). The PCV flow rate Qp is a flow rate of the blow-by gas passing through the PCV valve 34. Since the PCV flow rate Qp is a value correlated with the engine rotation speed NE and the engine load factor KL, the control device 100 calculates the PCV flow rate Qp based on the engine rotation speed NE and the engine load factor KL.

The threshold value Qpref is an adapted value as follows: That is, when the PCV flow rate Qp is small, the amount of the oil component in the blow-by gas contained in the gas in the cylinder decreases as the amount of the blow-by gas sent into the cylinder together with the intake air decreases. Therefore, there is a possibility that the lubrication of the seat of the direct injection valve 84 using the oil component in the blow-by gas cannot be sufficiently performed. Therefore, a lower limit value of the PCV flow rate Qp required to lubricate the seat with the blow-by gas is set in advance as the threshold value Qpref. The processing of the S120 in the present embodiment is processing for determining whether or not recirculation of blow-by gas by the blow-by gas processing device is being performed. When the PCV flow rate Qp is equal to or greater than the threshold value Qpref, it is determined that the blow-by gas is recirculated by the blow-by gas treating device.

When the PCV flow rate Qp is equal to or greater than the threshold value Qpref, the control device 100 determines whether or not the engine rotation speed NE is equal to or greater than the threshold value NEref (S130). The threshold value NEref is an adapted value as follows: That is, when the engine speed NE is low, the in-cylinder pressure is low, so that the force urging the needle in the valve opening direction is small. In this case, since the needle is not sufficiently separated from the seat, the opening of the injection hole of the direct injection valve 84 becomes insufficient. For this reason, there is a possibility that the suction process of suctioning the gas in the cylinder into the injection hole of the direct injection valve 84 cannot be sufficiently performed. Therefore, a lower limit value of the engine speed NE required for performing the suction process is set in advance as the threshold value NEref.

When the engine speed NE is equal to or higher than the threshold value NEref, the control device 100 performs the suction process (S140). As the above-described suction process, the control device 100 opens and closes the direct injection valve 84 during the compression stroke after a lapse of the specified period Ta from termination of fuel injection for obtaining the engine output. As the injection time when the opening and closing operation of the direct injection valve 84 is performed, for example, a minimum injection time that can be realized by the direct injection valve 84 can be set. Hereinafter, the opening and closing operation of the direct injection valve 84 performed to execute the suction process is referred to as minute amount injection.

Figure 3:
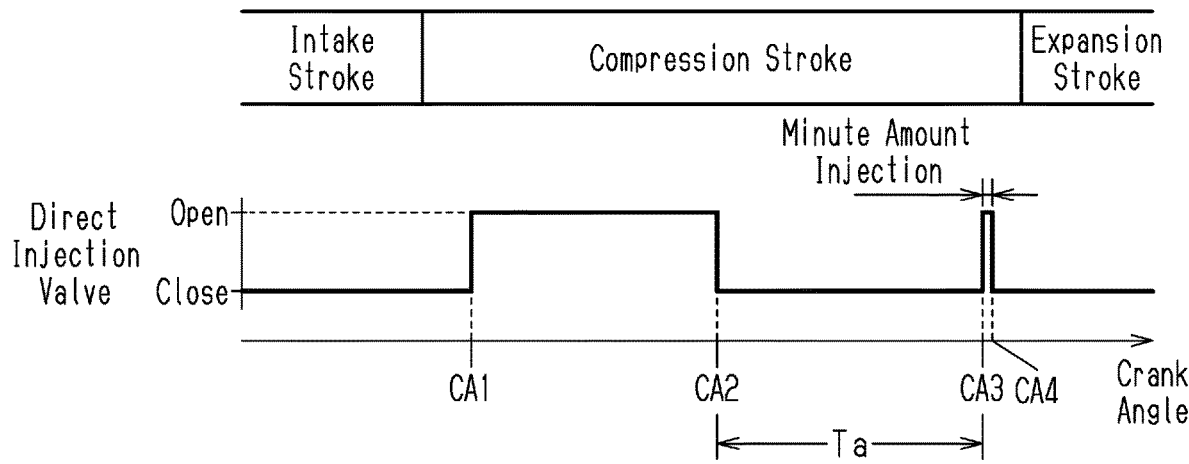
FIG. 3 is a timing diagram showing an execution example of a suction process according to the first embodiment.

FIG. 3 shows an execution example of the minute amount injection. In the example shown in FIG. 3, the fuel injection for obtaining the engine output is performed during the compression stroke, but may be performed during another process, for example, during the intake stroke.

As shown in FIG. 3, the fuel injection for obtaining the engine power is started at the crank angle CA1 in the first half of the compression stroke. Then, the fuel injection for obtaining the engine power is ended at the crank angle CA2. Then, at a crank angle CA2 during the compression stroke after a specified period Ta has elapsed from the crank angle CA3, the direct injection valve 84 is opened to start the minute amount injection. Then, at the crank angle CA4 during the compression stroke, the direct injection valve 84 is closed to terminate the minute amount injection.

The amount of gas in the cylinder suctioned into the injection hole of the direct injection valve 84 increases as the in-cylinder pressure increases. The in-cylinder pressure changes in accordance with the timing during the compression stroke and the engine speed NE. Therefore, the control device 100 variably sets the valve opening timing of the direct injection valve 84 at the time of executing the minute amount injection in accordance with the engine speed NE so that the amount of gas in the cylinder suctioned into the injection hole becomes an appropriate amount. That is, the period Ta is variably set in accordance with the engine rotational speed NE. In a simple manner, the valve opening timing of the direct injection valve 84 when the minute amount injection is executed may be set to a fixed value.

When the above-described processing of the S140 ends, the control device 100 temporarily ends this processing.

In addition, when a negative determination is made in any of the processes of the S100, the S120, and the S130, the control device 100 stops the suction process (150) and temporarily ends the present process.

Operation and Advantages

Operation and advantages of the present embodiment will now be described.

(1-1) The control device 100 executes the suction process of suctioning gas in the cylinder into the injection hole of the direct injection valve 84 when the blow-by gas is being recirculated by the blow-by gas processing device. The blow-by gas contained in the gas in the cylinder is suctioned into the injection hole of the direct injection valve 84 by executing the suction process. The blow-by gas contains an oil component. The seat of the direct injection valve 84 is thus lubricated by the oil component. This suppresses wear of the seat included in the direct injection valve 84, which injects gaseous fuel.

(1-2) As the above-described suction process, the direct injection valve 84 is opened and closed during the compression stroke after a lapse of the specified period Ta from termination of fuel injection for obtaining the engine output.

The execution of the suction process causes the gaseous fuel in the injection hole to flow out from the injection hole into the cylinder due to inertia immediately after the direct injection valve 84, which has been open, is closed. Immediately after the gaseous fuel flows out of the injection hole in this manner, the pressure in the injection hole drops temporarily. Therefore, the gas in the cylinder that exists around the opening of the injection hole opened in the cylinder is suctioned into the injection hole.

In addition, since the direct injection valve 84 is opened and closed during the compression stroke, in which the pressure in the cylinder becomes high, the suction of gas into the injection hole is promoted.

Further, immediately after the fuel injection for obtaining the engine output is performed, the amount of gaseous fuel that exists around the opening of the injection hole increases. In contrast, the amount of gas in the cylinder that contains blow-by gas decreases. The amount of gaseous fuel that exists around the opening of the injection hole decreases with the lapse of time after the end of injection. On the other hand, the amount of gas in the cylinder that exists around the opening of the injection hole and contains blow-by gas increases as the gaseous fuel decreases. Accordingly, in the present embodiment, the minute amount injection for opening and closing the direct injection valve 84 is performed after the lapse of the specified period Ta from termination of fuel injection for obtaining the engine output. This promotes the suction of gas in the cylinder, which contains blow-by gas, into the injection hole, while suppressing the suction of gaseous fuel into the injection hole.

Second Embodiment

Figure 4:
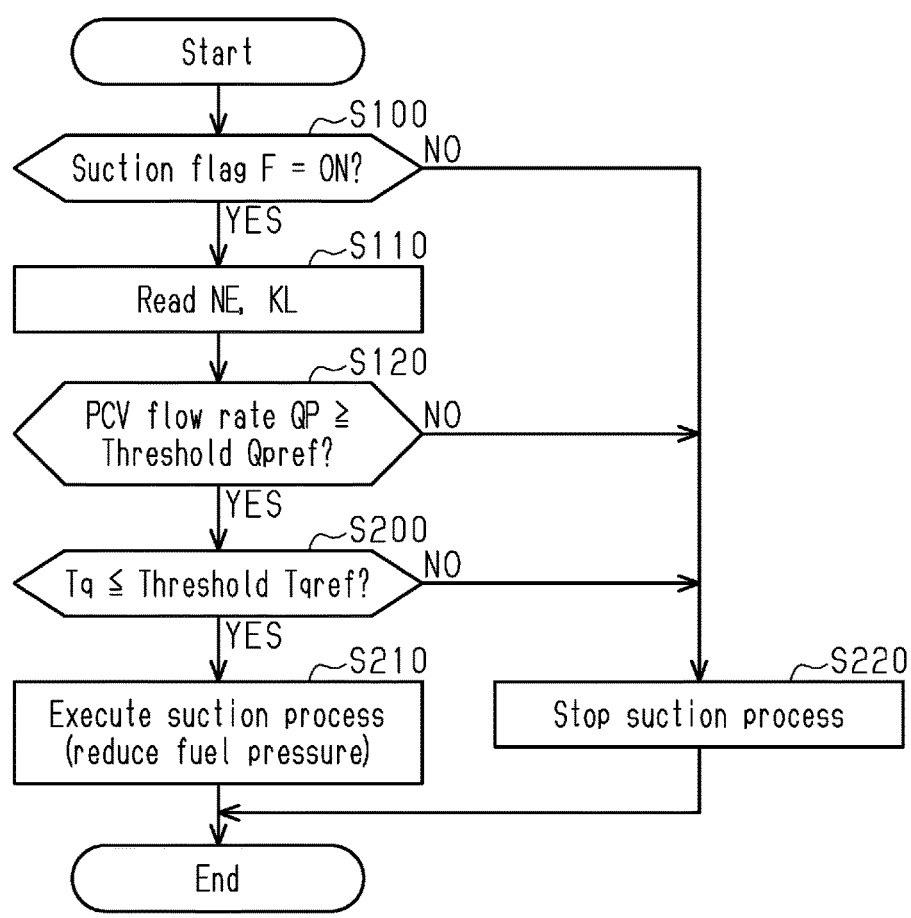
FIG. 4 is a flowchart showing a procedure of a process executed by a controller according to a second embodiment.

Next, a fuel injection control device for an internal combustion engine according to a second embodiment will be described. In the present embodiment, a suction process different from that in the first embodiment is performed. Hereinafter, the suction process of the present embodiment will be described focusing on differences from the first embodiment.
Suction Process FIG. 4 shows a processing procedure for executing the suction process in the present embodiment. In each processing shown in FIG. 4, the same processing contents as those of the processing shown in FIG. 2 are given the same step numbers.

When this process is started, the control device 100 determines whether or not the suction flag F is ON (S100). The intake flag F is, for example, a flag that is set to ON for each specified travel distance. The suction flag F is set to OFF when a suction process, which will be described later, is executed for a specified time or longer, or when a negative determination is made in any one of the processes of S120 and S200, which will be described later.

When the suction flag F is ON, the control device 100 reads the engine rotation speed NE and the engine load factor KL (S110).

Next, the control device 100 determines whether or not the PCV flow rate Qp is equal to or greater than the threshold value Qpref (S120). The PCV flow rate Qp and the threshold value Qpref are the same as the values described in the first embodiment.

When the PCV flow rate Qp is greater than or equal to the threshold value Qpref, the control device 100 determines whether or not the torque Tq generated from the engine 10 is less than or equal to the threshold value Tqref (S200). Since the torque Tq is a value correlated with the engine load factor KL and the like, the control device 100 calculates the torque Tq based on the engine load factor KL and the like.

The threshold value Tqref is an adapted value as follows. That is, when the torque Tq is large, the combustion temperature of the air-fuel mixture is high. Therefore, if the gas in the cylinder is suctioned into the injection hole of the direct injection valve 84, the direct injection valve 84 may be damaged. Therefore, as the threshold value Tqref, an upper limit value of the torque Tq that can suppress damage to the direct injection valve 84 due to the heat of the air-fuel mixture is set in advance.

When the torque Tq is equal to or less than the threshold value Tqref, the control device 100 executes the suction process (S210). As the suction process, the control device 100 executes a fuel pressure reduction process for controlling the pressure reducing valve 210 so as to reduce the fuel pressure P. In the fuel pressure reduction process, the target fuel pressure Pt calculated according to the engine operating state is set as a base value, and a value obtained by subtracting the pressure reduction amount Pd from the base value is set as a new target fuel pressure Pt. Then, the control device 100 controls the pressure reducing valve 210 so that the set target fuel pressure Pt is obtained. As the maximum in-cylinder pressure P max, which is the maximum value of the in-cylinder pressure, becomes higher, the amount of in-cylinder gas suctioned into the injection hole of the direct injection valve 84 through execution of the suction process increases. If the amount of suctioned gas increases excessively, the direct injection valve 84 may be damaged. Therefore, the control device 100 variably sets the pressure decrease amount Pd such that the higher the maximum in-cylinder pressure P max is, the smaller the pressure decrease amount Pd becomes. By variably setting the pressure decrease amount Pd in this manner, the higher the maximum in-cylinder pressure P max is, the more the decrease in the valve closing force described above is suppressed. Therefore, it is possible to suppress an excessive increase in the amount of the in-cylinder gas suctioned into the injection hole. The maximum in-cylinder pressure P max is calculated by the control device 100 based on the engine load factor KL, the engine rotation speed NE, and the like. For simplicity, the pressure decrease amount Pd may be a fixed value. Further, the target fuel pressure Pt at the time of executing the suction process may be directly set based on the maximum in-cylinder pressure Pmax.

When the above-described processing of the S210 ends, the control device 100 temporarily ends this processing.

In addition, when a negative determination is made in any of the processes of the S100, the S120, and the S200, the control device 100 stops the suction process (220) and temporarily ends the present process.
Operation and Advantages Operation and advantages of the present embodiment will now be described.

(2-1) The control device 100 executes the suction process of suctioning gas in the cylinder into the injection hole of the direct injection valve 84 when the blow-by gas is being recirculated by the blow-by gas processing device. The blow-by gas contained in the gas in the cylinder is suctioned into the injection hole of the direct injection valve 84 by executing the suction process. The blow-by gas contains an oil component. The seat of the direct injection valve 84 is thus lubricated by the oil component. This suppresses wear of the seat included in the direct injection valve 84, which injects gaseous fuel.

(2-2) As the above-described suction process, the fuel pressure reduction process is executed, in which the pressure reducing valve 210 is controlled such that the fuel pressure P is reduced as compared with a case in which the suction process is not executed. When the suction process is executed, the pressure of the gaseous fuel supplied to the direct injection valve 84 decreases. This separates the needle of the direct injection valve 84 from the seat due to the pressure in the cylinder. Therefore, the gas in the cylinder can be suctioned into the injection hole of the direct injection valve 84.

Modifications

The above-described embodiments may be modified as follows. The above-described embodiments and the following modifications can be combined as long as the combined modifications remain technically consistent with each other.

In the suction process of the S140 described in the first embodiment, the minute amount injection is performed in the compression stroke, but another suction process may be performed. For example, the fuel injection from the direct injection valve 84 may be executed during the compression stroke, and the suction process may be a process of retarding the end timing of the fuel injection as compared with the case in which the suction process is not executed.

Also in this modification, immediately after the direct injection valve 84 that has been opened is closed, the gaseous fuel in the injection hole flows out from the injection hole into the cylinder due to inertia. Immediately after the gaseous fuel flows out of the injection hole in this manner, the pressure in the injection hole drops temporarily. Therefore, the gas in the cylinder that exists around the opening of the injection hole opened in the cylinder is suctioned into the injection hole. In addition, by performing fuel injection from the direct injection valve 84 and performing the opening and closing operation of the direct injection valve 84 during the compression stroke in which the pressure in the cylinder becomes high, suction of gas into the injection hole is promoted. Here, as the suction process, the end timing of the fuel injection executed during the compression stroke is. Therefore, the in-cylinder pressure at the time when the fuel injection is ended is higher than that in the case in which the suction process is not executed, and thus it is possible to promote the intake of the gas in the cylinder into the injection hole.

Figure 5:
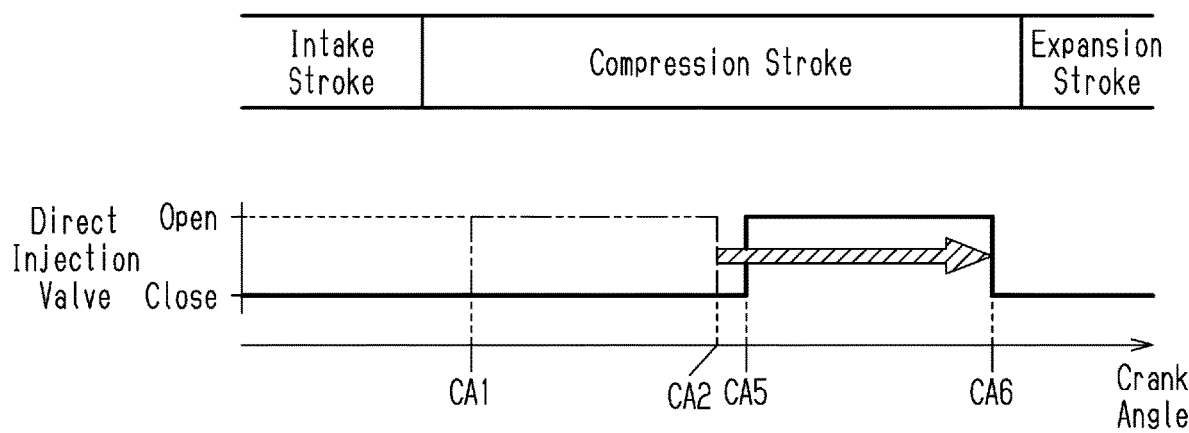
FIG. 5 is a timing diagram showing a suction process according to a modification of the first embodiment.

FIG. 5 shows a change in the fuel injection period in the modified example. In FIG. 5, the fuel injection executed from the crank angle CA1 to the crank angle CA2 during the compression stroke is the fuel injection for obtaining the engine power and is the fuel injection period when the suction process is not executed. On the other hand, in FIG. 5, the fuel injection executed from the crank angle CA5 to the crank angle CA6 during the compression stroke is the fuel injection for obtaining the engine power and is the fuel injection period when the suction process is executed.

As shown in FIG. 5, when the suction process is executed, the control device 100 retards the entire fuel injection period so that the fuel injection end timing is to a crank angle CA2 later than the crank angle CA6. The retardation amount of the fuel injection end timing at this time may be simply a fixed value, but may be variably set, for example, as follows. That is, as described above, the amount of gas in the cylinder suctioned into the injection hole of the direct injection valve 84 increases as the in-cylinder pressure increases. The in-cylinder pressure changes according to the timing during the compression stroke and the engine speed NE. Therefore, the control device 100 may variably set the retard amount of the end timing of the fuel injection in accordance with the engine speed NE so that the amount of gas in the cylinder suctioned into the injection hole becomes an appropriate amount. In the case in which the end timing of the fuel injection is during the compression stroke, the atomization state of the fuel and the amount of fuel adhering to the piston may change as compared with the case in which the end timing of the fuel injection is not. Therefore, in this modification, the fuel injection period during the execution of the suction process may be different from the fuel injection period before the execution of the suction process.

In the first embodiment, the processing of the S130 may be omitted.

In the second embodiment, the processing of the S200 may be omitted.

Although the gaseous fuel is hydrogen gas, other gaseous fuels such as compressed natural gas may be used.

The internal combustion engine 10 does not necessarily need to include the intake-side variable valve timing mechanism 85 or the exhaust-side variable valve timing mechanism 86.

It is not essential that the internal combustion engine 10 includes the forced-induction device 24.

The control device 100 includes a CPU 110 and a memory 120, and executes software processing. However, this is merely an example. For example, the control device 100 may include a dedicated hardware circuit (such as an ASIC) that executes at least part of the software processing executed in the above-described embodiments. That is, the control device 100 may be modified as long as it has any one of the following configurations (a) to (c). (a) A configuration including a processor that executes all of the above-described processes according to programs and a program storage device such as a memory that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software circuits each including a processor and a program storage device and multiple dedicated hardware circuits may be provided. That is, the above processes may be executed in any manner as long as the processes are executed by processing circuitry that includes at least one of a set of one or more software circuits and a set of one or more dedicated hardware circuits. The program storage device, which is a computer-readable medium, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel injection control device for an internal combustion engine, wherein
the internal combustion engine includes:

a direct injection valve that directly inject gaseous fuel from an injection hole into a cylinder by separating a needle from a seat; and a blow-by gas treating device that recirculates blow-by gas from a crankcase to an intake passage, and the fuel injection control device comprises processing circuitry configured to execute a suction process of suctioning gas in the cylinder into the injection hole when the blow-by gas is being recirculated by the blow-by gas processing device.

2. The fuel injection control device for the internal combustion engine according to claim 1, wherein the suction process is a process of opening and closing the direct injection valve during a compression stroke after a lapse of a specified period from termination of fuel injection for obtaining engine output.

3. The fuel injection control device for the internal combustion engine according to claim 1, wherein the processing circuitry is configured to execute fuel injection from the direct injection valve during a compression stroke, and the suction process is a process of retarding an end timing of the fuel injection as compared with a case in which the suction process is not executed.

4. The fuel injection control device for the internal combustion engine according to claim 1, wherein the internal combustion engine further includes a pressure adjusting mechanism that adjusts a pressure of the gaseous fuel supplied to the direct injection valve, and the suction process is a process of controlling the pressure adjusting mechanism such that the pressure is reduced as compared with a case in which the suction process is not executed.

* * * * *